(12) United States Patent
Bold (10) Patent No.: US 7,748,888 B2
(45) Date of Patent: Jul. 6, 2010

(54) APPARATUS FOR STABILIZING PLASTER (75) Inventor: Joerg Bold, Kaiserslautern (DE)

(73) Assignee: Lafarge Platres, Avignon Cedex (FR)

( * ) Notice: Subject to any disclaimer, the term of this patent is extended or adjusted under 35 U.S.C. 154(b) by 78 days.

(21) Appl. No.: 12/068,335

(22) Filed: Feb. 5, 2008

(65) Prior Publication Data

US 2008/0135072 A1 Jun. 12, 2008

Related U.S. Application Data (62) Division of application No. 11/014,998, filed on Dec. 20, 2004, now Pat. No. 7,371,278.

(30) Foreign Application Priority Data

Dec. 19, 2003 (EP) .................................. 03293240

(51) Int. Cl.
*B28C 1/22* (2006.01)
(52) U.S. Cl. ............................. 366/24; 366/27; 366/38; 366/50
(58) Field of Classification Search ............... 134/104.1, 134/107; 239/115; 366/24, 25, 57, 58, 175.1, 366/175.3, 228, 229, 231, 27, 38, 50, 230
See application file for complete search history.

(56) References Cited

U.S. PATENT DOCUMENTS

| 121,351 | A | * | 11/1871 | Franke | .......................... | 366/24 |
| 764,870 | A | * | 7/1904 | Smith | .......................... | 422/113 |
| 1,142,521 | A | * | 6/1915 | Hornsey | ...................... | 366/229 |
| 1,207,180 | A | * | 12/1916 | Kleinschmidt | ........... | 366/137.1 |
| 1,334,317 | A | * | 3/1920 | Popkess et al. | ......... | 106/284.04 |
| 1,363,560 | A | * | 12/1920 | Browne | ....................... | 366/14 |

(Continued)

FOREIGN PATENT DOCUMENTS

DE 553 519 6/1932

(Continued)

OTHER PUBLICATIONS

Machine translation (EPO) of DE 3921899 A1, Jun. 15, 2009.*

(Continued)

*Primary Examiner*—David L Sorkin
*Assistant Examiner*—Andrew Janca
(74) *Attorney, Agent, or Firm*—Buchanan Ingersoll & Rooney PC (57) ABSTRACT

A process for stabilizing plaster includes: a) providing a heated HH-plaster; b) feeding the hot plaster in a moistening device having walls heated to at least 100° C.; c) injecting water and/or steam into the moistening device in conditions that such not yet moistened surfaces of the plaster are exposed to the injected water and/or steam; d) maintaining an atmosphere in the moistening device at a level of the dew point in the range of 75 to 99° C.; e) feeding the moistened blend into a curing device; f) maintaining an atmosphere in the curing device above 75° C. for at least 3 minutes; g) feeding the moistened and cured blend into a drying device; and h) drying the moistened and cured blend.

Also an apparatus for moistening β-hemihydrate plaster includes a rotating drum with lifting blades inside where all walls in contact with the product are externally heated at a temperature above 100° C.

8 Claims, 4 Drawing Sheets

U.S. PATENT DOCUMENTS

| | | | |
|---|---|---|---|
| 1,370,581 A | | 3/1921 | Brookby |
| 1,675,717 A | * | 7/1928 | Fritz ............................ 366/57 |
| 1,713,879 A | | 5/1929 | McAnally |
| 1,717,704 A | * | 6/1929 | Greene .......................... 366/24 |
| 1,777,002 A | * | 9/1930 | Knowles ........................ 366/24 |
| 1,836,754 A | * | 12/1931 | Hepburn ........................ 366/25 |
| 1,999,158 A | | 4/1935 | Roos |
| 2,122,551 A | * | 7/1938 | Allingham ................ 366/173.2 |
| 2,177,668 A | | 10/1939 | Marsh et al. |
| 2,256,281 A | * | 9/1941 | Finley ........................... 366/24 |
| 2,504,378 A | * | 4/1950 | Bell .............................. 34/136 |
| 2,703,704 A | * | 3/1955 | Wylie ............................ 366/24 |
| 2,848,210 A | * | 8/1958 | Compton ...................... 423/172 |
| 2,996,022 A | * | 8/1961 | McCashen .................. 366/76.9 |
| 3,415,910 A | | 12/1968 | Kinkade et al. |
| 3,527,447 A | | 9/1970 | Kinkade et al. |
| 3,796,509 A | * | 3/1974 | Wood ........................... 415/116 |
| 4,010,081 A | * | 3/1977 | Martt ............................ 202/228 |
| 4,117,070 A | | 9/1978 | O'Neill |
| 4,153,373 A | | 5/1979 | O'Neill |
| 4,165,184 A | * | 8/1979 | Schlarmann .................... 366/12 |
| 4,168,919 A | * | 9/1979 | Rosen et al. .............. 366/173.2 |
| 4,360,386 A | | 11/1982 | Bounini |
| 5,947,720 A | * | 9/1999 | Kelly ............................ 432/105 |
| 6,363,625 B1 | * | 4/2002 | Niemi ........................... 34/136 |
| 6,726,351 B2 | * | 4/2004 | Dillman ........................ 366/57 |
| 2008/0135072 A1 | * | 6/2008 | Bold .......................... 134/104.1 |

FOREIGN PATENT DOCUMENTS

| | | | |
|---|---|---|---|
| DE | 3921899 A1 | * | 8/1990 |
| DE | 3917117 A1 | * | 11/1990 |
| EP | 0 008 947 A1 | | 3/1980 |
| EP | 15200 A1 | * | 9/1980 |
| EP | 0 344 430 A2 | | 12/1989 |
| EP | 0774445 A1 | | 5/1997 |
| EP | 0 818 427 A2 | | 1/1998 |
| FR | 2 383 893 | | 3/1978 |
| GB | 1 233 436 | | 5/1971 |
| GB | 2 053 178 | | 2/1981 |
| GB | 2086874 A | | 5/1982 |
| JP | 01135524 A | * | 5/1989 |
| WO | WO 9011125 A1 | * | 10/1990 |

OTHER PUBLICATIONS

European Search Report dated Apr. 8, 2004.

* cited by examiner

APPARATUS FOR STABILIZING PLASTER

TECHNICAL FIELD

This invention deals with the post-treatment of a calcined gypsum plaster, said treatment being known under the terms forced ageing or stabilization.

BACKGROUND ART

Gypsum is calcium-sulphate dihydrate (DH) of the formula $CaSO_4.2H_2O$. Vast deposits of natural gypsum provide gypsum rock or gypsum sand. Synthetic gypsum originates from the phosphoric acid production and more and more from Flue Gas Desulphurization (FGD)

Plaster, in this context and in the generally accepted terminology of the art, is partially dehydrated gypsum of the formula $CaSO_4.xH_2O$ where x=0 to 0.5, with the potential to re-crystallize to a solid structure when mixed with an appropriate amount of water.

Calcining means the thermal treatment of a DH in order to remove a part of the combined water.

Hemihydrate (HH) or semihydrate (SE) is the metastable hydrate of the formula $CaSO_4.\frac{1}{2}H_2O$.

Anhydrite III (AIII) is a dehydrated HH with the potential of reversibly absorbing water or even vapor. The reversible uptake of water liberates considerable reaction heat.

Anhydrite II (AII) is the completely dehydrated product. It is formed at higher temperatures and is not welcome in stucco plasters and therefore, in calcining for industrial plasters, conditions to create AII are avoided as far as possible.

HH and AIII are the products resulting from the first steps of calcining. Whether AIII or HH is first formed depends on the calcining temperature and the vapor pressure in the calcining ambience.

Generally plasters are calcined under dry conditions meaning in hot air or in an indirectly heated calcining vessel. Under those conditions the size and shape of the DH particle of origin remains essentially the same. Thus the resulting plaster is porous. It is ordinarily called stucco or plaster of Paris. The accepted technical term is β-Hemihydrate (β-HH).

The possible use of plasters as a binder results from its ability to build up a completely new crystalline structure out of an aqueous slurry. This is due, in the first place, through the very big difference in the solubilities of HH and DH (about 8 g/l vs. 2.7 g/l). Thus, a HH creates a tremendous over-saturation with regard to DH. The over-saturation leads to the formation of germs and quick re-crystallization sets in.

Normally, salts increase their solubility with the temperature. Ca—Sulphate behaves rather irregular in decreasing its solubility. The solubility curves of HH and DH cross each other at about 100° C. In the temperature range between 85 and 100° C. the differences in solubility are so small that setting virtually does not start at all. At 75° C. the reaction rate is still very low.

Due to the rough thermal treatment the physical microstructure of β-HH is stressed and quite unstable. Thus, one observes that, in contact with liquid water, a β-HH will partially disintegrate into very small particles. However, by absorbing humidity, the stress is lowered and the disintegration phenomenon fades. Simultaneously the speed of dissolution in water diminishes. The phenomenon is called "ageing". The term is quite misleading because it is more an effect of the ambient conditions (humidity, temperature) than of time.

Because of ageing, β-HH has the tendency to change its rheology and setting kinetics over the time dramatically. The drift in rheology is caused by the diminishing tendency of β-HH to disintegrate, as explained above, in very fine particles. The drift in kinetics has to do with the "healing" of crystalline defects (spots of heightened activity) in the calcined product.

The starting point of the drifting properties depends largely upon the origin of the plaster, the granulometry and the calcining conditions. There is a widely accepted consensus that the adsorption of water is the main promoter of ageing. AIII can take up as much humidity as to become HH. Then, surprisingly, the uptake of water continues until about 8% combined water, which is significantly above the theoretical value of HH, without forming DH.

Ageing is a problem in construction/wall plasters where the conditions of storage and the delay between calcining and application can vary in a wide range. In plasterboard production ageing is a problem as well, albeit to a lesser extent.

Plasters, which have reached their virtual final state of ageing, offer two main advantages:

a) constancy and reliability;

b) control of the granulometry and, thus, of the rheology.

This has the effect of for example, without being limited thereto:

less overall variation in product qualities;
  less water to dry out in plasterboard manufacture; and
  less retarder in construction wall plasters;
  less ultrafines in gypsum fiber boards, resulting in an easier dewatering.

The art knows since long time how to age a plaster forcedly. The basic idea is quite simple: give all, or even more, of the water at once that is needed to quench the "thirst" of the plaster. The process has been called "stabilization" in the prior art.

Note that forced ageing or stabilization in the sense it is used in the present invention is not "aridisation" which is essentially calcining in the presence of deliquescent substances (see e.g. U.S. Pat. No. 1,370,581).

U.S. Pat. No. 1,713,879 is apparently the first publication dealing with stabilizing. It discloses the mixing with water and/or steam with a calcined plaster. The purpose is to reduce the water demand and the temperature rise during setting. The figures are: 12 to 15 pounds of water/minute for one ton of plaster over a period of 5 to 6 min (equivalent to 5 to 9% water in total). The plaster is preferably a "single boil plaster" (i.e. essentially HE without AIII). It is a batch type operation. There is no z mention of temperatures or specific features of the equipment used. A variant is the introduction of water by means of a carrier like diatomaceous earth. The process is called (forced) ageing and not yet stabilizing.

DE-A-553519 discloses a process of treating calcined plaster with water and/or steam in order to render the plaster less sticky and less water demanding. The amount of water absorbed is 0.5 to 7%. It uses the reaction heat of AIII in order to heighten the temperature. The temperature at the end is between 80 and 130° C. and should not exceed 140° C. The patent does not disclose limits for the curing time but gives an example of half an hour of treatment of plaster with the exhaust gases of a rotary kiln. The temperature of the plaster discharged is 95° C. There is no mention about drying but. There is a mention that the treatment can be done in rotary apparatus, which allows an intimate contact of the steam with the product.

U.S. Pat. No. 1,999,158 mentions and relies apparently upon U.S. Pat. No. 1,370,581 (aridisation). The field of application is wall plasters. The claimed improvement lies in the superfine-grinding in order to increase the plasticity and to reduce the change in setting time over elapsed storage time of the powder. Plasticity is defined by the US consistency of 65 to 75. The fineness of the ground plaster is described as having a large part smaller than 10 µm. (Note that the term stabilized plaster is first used)

U.S. Pat. No. 2,177,668 deals with forced ageing which is in this case essentially the reversion of AIII to HH by the treatment of the calcined plaster with huge amounts of air of about ambient RH (60% RH) and a temperature just below the theoretical stability temperature of DH at 42° C.

U.S. Pat. No. 3,415,910 discloses quenching of a hot plaster with water whilst maintaining a temperature high enough to avoid the formation of DH (between 82 and 100° C.) and subsequent heating above 102° C. (drying up to 157° C.). The moisture content at the highest was 3%. The drying was done up to the point where the theoretical value of combined water for HH was attained. The preferred (and exclusively described method) was using a kettle as calciner and utilizing the same kettle as the device for the treatment and subsequent drying step. The plaster obtained and claimed is characterized by: (i) density at 20° C.=2.60 g/ml (<10% below 1.6 and <10% above 2.68 g/ml) and (ii) stacking order index above 8. The patent describes the role of disintegration on water demand and the rheological properties.

GB-A-1233436 is essentially equivalent to U.S. Pat. No. 3,415,910. However some slight differences and additional information are disclosed, suggesting that the process has been further developed. For example the maximum moisture has risen to 3.5%, the admissible calcining temperature is now 160° C. Treatment temperature in laboratory could be as low as room temperature. A preferred treatment temperature in industrial application is between 82 and 93° C. A preferred drying temperature is above 115° C. Graphs demonstrate the effect of free moisture and of curing time on the US consistency suggesting that 3% at 3 min are the lower limits of operation.

U.S. Pat. No. 3,527,447 is an improvement over U.S. Pat. No. 3,415,910. It discloses the drying step carried out in a separate device under sub-atmospheric pressure. In order to maintain the required temperature range an additional energy input by means of microwaves is suggested.

U.S. Pat. No. 4,117,070 (and related U.S. Pat. No. 4,153,373 and FR-A-2383893) proceeds to a continuous method for stabilizing without drying as part of a plasterboard production process. In a specific embodiment 50 to 75% of the board line feed are treated with 1 to 8% of free water cured for about one minute and this feed is then recombined and mixed with the remaining portion of the feed which is cured another three minutes. The total moisture after recombination is 3-4%. Is disclosed a fluidized and agitated vessel as a wetting vessel.

EP-A-0008947 deals with the inconvenience of storing a longer time wetted plaster. It introduces the notion of "set suddenness" which is the maximum temperature rise during setting. High set suddenness is disclosed as essential for the development of an adequate mechanical resistance and is substantially reduced by the stabilization procedure. The remedy for this drawback is grinding the treated (dried or not) plaster to a fineness 3 to 4 times the original (measured in Blame)

GB-A-2053178 discloses the simultaneous grinding and wetting in an "Entoleter" mill or the like. Curing happens after the size reduction. The set suddenness of EP-A-0008947 is attained by this procedure as well.

Those patents differentiate between forced ageing (i.e. quenching/moistening) and stabilizing (i.e. quenching/moistening and curing, and optionally drying) They claim different approaches to obtain an aged or a stabilized plaster and specify appropriate granulometries for the use in plasterboard production.

Every stabilizing method includes the steps of moistening and curing. Moistening is the trickiest part, but curing has some problems as well. Two main concerns are: (1) unintended rehydration, which creates DH, acting as crystallization seeds in plaster slurries and (2) built-ups or scaling in the equipment.

The formation of DH occurs if liquid water and plaster are in contact over a certain time under thermodynamic conditions allowing the reaction that is at lower temperatures. It is obvious that the moistening of a binder like plaster leads inevitably to the formation of lumps and that every surface in contact with the moistened product and/or the moistening liquid has a tendency to build up crusts of potentially hardened matter. The problems are more pronounced in the moistening part of the devices because moistening includes mixing which produces dust and includes the presence of water which can lead to condensation.

What has been disclosed in the related art with regard of solving the problems mentioned above is not satisfying. In U.S. Pat. No. 3,415,910, the use of a kettle with the need to cool down and reheat the whole equipment is time and energy costly. U.S. Pat. No. 4,153,373 describes as a wetting apparatus a fluidized and agitated vessel used in the process of treating plaster for plasterboard production. Here the formation of traces of DH does no harm because the plaster is to be accelerated anyway in the plasterboard line. GB-A-2053178 combines wetting and grinding in one step also in the context of plasterboard production. Scaling is here avoided by shear forces but the DH issue remains unsolved.

SUMMARY

The present invention aims at solving the problems and provides a process for stabilizing a β-Hemihydrate plaster (β-HH) and an apparatus for implementing the process. It has been found that the scaling and DH problems can be solved by maintaining conditions from moistening until drying where hydration of the HH cannot take place. In the invention the hygro-thermal conditions are controlled in the space of treatment and the temperatures of parts in contact with the product are controlled.

Additional mechanical measures might be taken to prevent build-ups of product on the parts of the equipment involved.

Thus, the invention provides a process and apparatus as defined in the claims.

BRIEF DESCRIPTION OF DRAWINGS

The embodiments of the invention are disclosed in reference to the accompanying drawings, in which.

DETAILED DESCRIPTION OF EMBODIMENTS OF THE PREFERRED EMBODIMENT

As indicated above, the invention provides a process of stabilizing a calcined B-hemihydrate plaster by moistening and curing and optionally drying comprising the steps of:

a) providing a heated HH-plaster preferably at temperatures over 100° C.;

b) feeding the hot plaster in a moistening device having walls heated to at least 100° C.;

c) injecting water and/or steam into the moistening device in conditions that such not yet moistened surfaces of the plaster are exposed to the injected water and/or steam;

d) maintaining an atmosphere in the moistening device at a level of the dew point in the range of 75 to 99° C.; feeding the moistened blend into a curing device e) maintaining an atmosphere in the curing device above 75° C., preferably between 75 and 99° C., for at least 3 minutes, preferably between 4 and 15 minutes;

f) feeding the moistened and cured blend into a drying device; and g) drying said moistened and cured blend.

Optionally, the process can comprise the following steps:

h) grinding the dried product; and/or i) cooling the dried product, where the cooling can take place before or after the grinding step.

In the above process, it is preferred to provide a metering of the combined water and/or steam amount so as to get 3 to 12%, based on the weight of the HH, of free moisture in the moistened blend.

In the above process, the atmosphere of the moistening and/or curing can be controlled by (1) controlling the flow of external air trough the moistening and/or curing device and/or by (2) controlling the heating of the walls of the moistening and/or curing device.

The process described above can be carried out batch-wise or in a continuous way, the latter being the preferred one. In this case some of the mentioned steps (and corresponding devices) might be zones of a single device. In one preferred embodiment moistening and curing are combined in the same apparatus.

Hence, steps d), e) and f) are preferably combined into a single step of "moistening and curing". Also, steps h) and i) are preferably combined.

Figure 1:
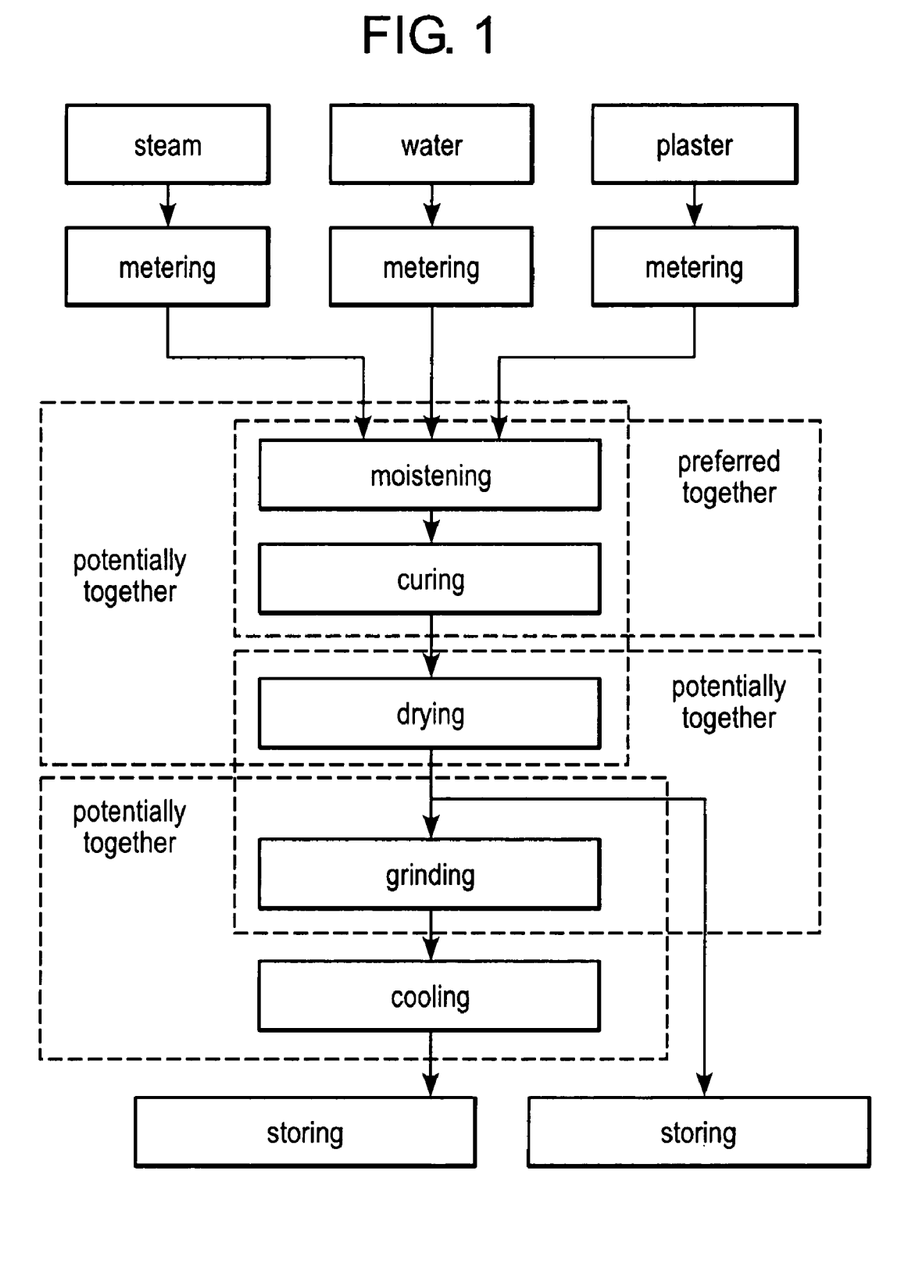
FIG. 1 is a general scheme of the overall process of the invention.

FIG. 1, which is a general scheme of how the treatment works, depicts each single step and the potential combining of several steps, with the preferred embodiments of the invention.

As far as steps a) and b) are concerned, it should be noted that the process has to be run at elevated temperature in order to avoid rehydration. In a stabilizing step, implemented in a plaster plant, the plaster comes out of the calcining device generally at temperatures ranging from 155 to 180° C. During the first steps of conveying it cools down generally to 120 to 140° C. In the case of the higher domain of temperature the need of cooling down the plaster occurs. Since the plaster has to be moistened cooling can be done by direct injection of water which will cool by evaporation and by heat exchange. If the cooling is done in the same device as the moistening an additional advantage is the generation of sufficient vapor to create high humidity in the atmosphere of the moistening device raising the dew point to the desired temperature of 75 to 99° C.

As far as steps c) and d) are concerned, it should be noted that in the stabilization process liquid water should be present. When water alone is injected it is clear that water will be present; when steam is used then condensation at cooler parts occurs. If locally the offer of water is higher than the demand by the absorptive capacity of the plaster present, the plaster particles will stick together and will form more or less persistent lumps. If the water adheres on a part of the equipment the plaster will stick on this part. Hence, the water and/or steam is preferably metered so that condensation, if any takes place, when combined with added liquid water if any, will produce the required amount of water.

The range of percentage of added water and the corresponding needed curing time is known. The related art shows that there is a certain evolution in the behavior with increasing water addition and curing time. At higher figures the change levels out to "saturation". In order to avoid changing properties it is preferred to work at this "saturation" level. It is reached above 3% free moisture and above 3 minutes curing time. At high water addition the behavior of the plaster will get closer to the normally gauged plaster. An upper limit of free moisture is thus preferably 12%.

As far as step e) is concerned, it should be noted that maintaining at about the dew point is important because this is the temperature of equilibrium between temperature and evaporation rate. Otherwise, the temperature of the system will always shift rapidly toward the dew point. If external air with a low dew point enters the device it will inevitably cool down the product even if the air is much hotter than the product.

The atmosphere can be controlled by air introduced and/or by heating the walls. Heating the walls is already there in order to avoid condensation. The heat transfer through the walls can contribute to the thermal regime by compensation heat losses by evaporation. In this case the product temperature can by slightly above the dew point.

As far as step f) is concerned, it should be noted that curing time is also an important parameter. The needed time depends upon the nature of the plaster, the temperature and moisture. The minimum required here is 3 minutes. However longer times are preferable because they will tend more into the saturation domain. Typical curing times are from 4 to 15 minutes.

As far as step h) is concerned, it should be noted that the drying temperature is not critical in the first place and can go up to about 160° C. (see the previously cited prior art documents). However, it has been found that drying at lower temperatures gives more reproducible results. A product temperature below 115° C. is preferable. A special drying method works at temperatures below 105° C. It has been found that under this condition the drying stops at total water content of about 7.0% LOI (Loss Of Ignition). This LOI is significantly higher than the theoretical LOI of 6.2%. (all figures based at 100% purity of the plaster). Surprisingly plasters with this LOI do not, as one could expect, recombine the over-stoichiometric water into DH. Even an LOI of 8% is admissible. In this respect they are alike plasters having been aged naturally at severe conditions (60° C. and 90% RH over more than 24 h)

As far as step i) is concerned, it should be noted that the grinding needed to get the required fineness depends largely of the nature of the raw gypsum used and the intended use of the stabilized plaster. For molding purposes as well as for plasterboard production a fineness of about d50=15 to 22 μm is optimal. For filtering processes the natural particle size distribution (PSD) of FGD gypsum is very well suited. For compression-filtering processes a broad PSD is preferable. In any case the PSD given by a grinding and/or selecting process is maintained in the aqueous slurry. A bimodal distribution can be obtained as well, especially starting from FGD gypsum.

As far as step j) is concerned, it should be noted that very often β-HH has a certain percentage of AIII. In contact with water AIII rehydrates to HH. In ordinary plasters AIII plays useful role in absorbing humidity. If plaster is stored in bags, moisture diffuses from outside. By absorbing this moisture AIII acts as a buffer and prevents for a certain time the altering of the properties induced by said moisture. Hot plaster stored in a silo will cool down slowly from the walls. This process can induce condensation near the walls. Sufficient AIII can then prevent the formation of DH. A stabilized plaster has no AIII. Thus, if stored in a silo it should be cooled down sufficiently in order to avoid condensation. Hence, it may be useful to have a determined cooling step.

The stabilized β-HH of the invention is stable with regard to disintegration and setting kinetics. It is substantially free of AIII and its combined water is above the theoretical value. Any required PSD, adapted on its specific use, can be obtained by grinding sifting and/or blending.

The stabilized β-HH of the invention is useful as a binder and/or filler in wall plasters, for gypsum fiberboard production according to a filtration process, for plasterboard production, for industrial plasters, for jointing compounds, for high strength gypsum fiberboard product according to a press-filtering process, etc.

For every application a specific PSD in the aqueous plaster slurry is optimal and can be properly attained by suitable grinding of a plaster treated according to the present invention.

For example, one can cite:

d50 of 30 to 100 μm: as a binder and/or filler in wall plasters.

d50 of 20 to 30 μm: for gypsum fibreboard production according to a filtration process.

d50 of 15 to 22 μm: for plasterboard production.

d50 of 10 to 20 μm: for industrial plasters and/or for jointing compounds.

bimodal with a first peak at 3 to 10 μm and a second peak at 20 to 60 μm: for high strength gypsum fibreboard production by the press-filtering process.

Devices for implementing the process of the invention should be able to be operated under the indicated hygrothermal conditions. For the moistening/curing part e.g. a rotary shaft granulator as used for fertilizer or a device like a glue blender for particle board with steam jacket is suited. An Air Mix® granulator fed with steam loaded air and heated walls is suited as well. For the drying part almost every drier for powders is suitable (as long as it does not allow cooling down the moist plaster to conditions allowing rehydration)

Figure 2A:
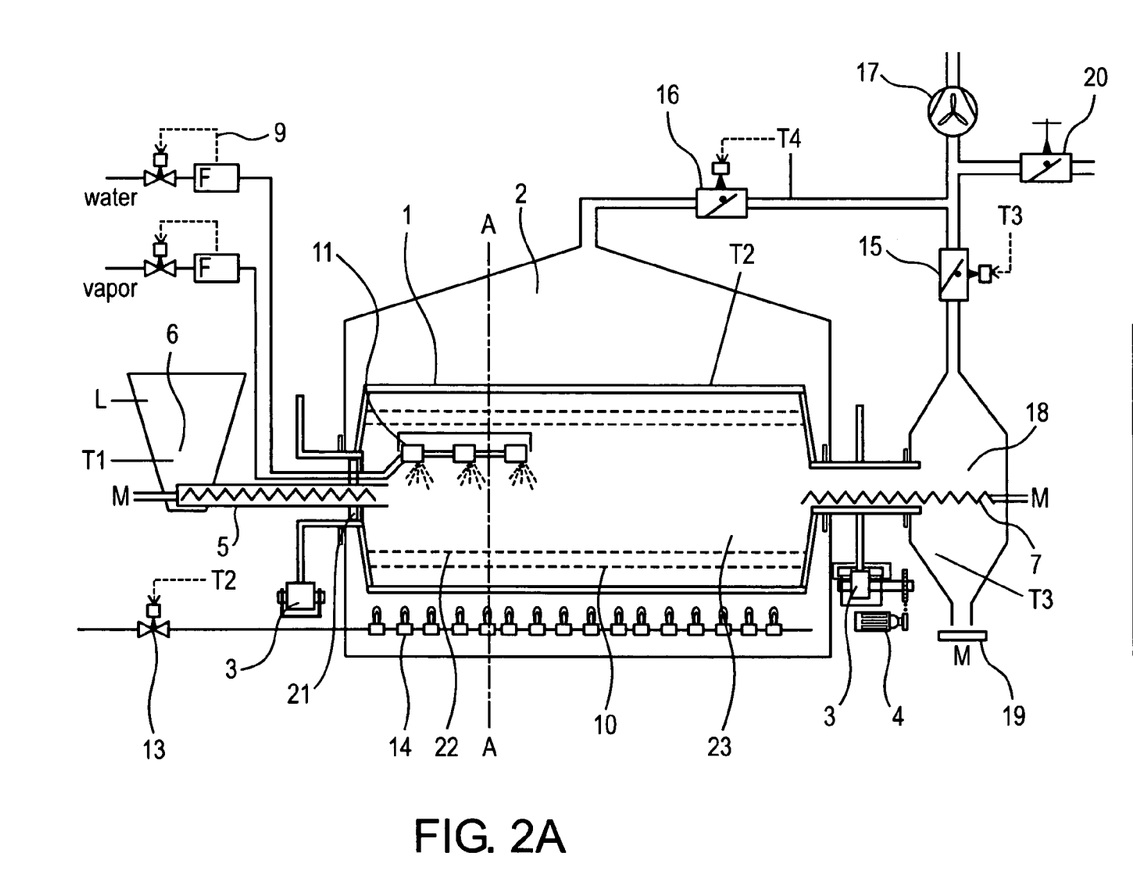
FIGS. 2a and 2b show a preferred embodiment of a moistening device.
Figure 2B:
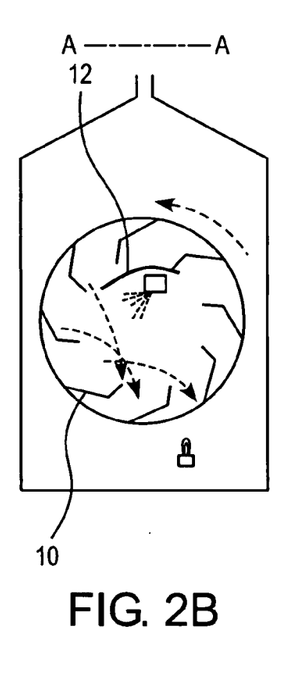

FIGS. 2a and 2b (side view of 2a along lines AA) show an embodiment of the invention. The moistening device comprises a drum 1 rotating in heated space 2. The drum is supported on bearings 3 and driven by a motor 4 outside of the heated space so that the complete surface of the drum, potentially in contact with plaster, is heated. Feed and extraction are done by conveyor screws. The feeding screw 5 is a metering screw. A certain level of product is maintained in the hopper 6 (equipped with a level sensor) in order to seal the interior of the drum from the outside. The extracting screw 7 runs at a speed suitable for extracting the incoming plaster. The product is collected in the discharge housing 18 and finally extracted by a dish extractor 19. The moistening happens through two phase (vapor-water) pulverizing nozzles 11. The metering is performed by an appropriate device as for example a combination of flow-meter and control valve 9. The interior of the drum is equipped with (lifting) blades 10 able to uptake the plaster and to release it successively as shown by the arrows in FIG. 2b. The plaster cascade is sprayed with water and/or vapor. The spraying nozzles are protected from being covered with plaster by a roof 12 which is constantly cleaned by the passing blades 10. One feature not shown in the drawings is that the blades in the area of the roof are fixed on spring steel ribbons. The roof is slightly inclined so that the blades become under tension and spring back when they have passed the roof. Then they hit an obstacle. The shock shakes off potential build-ups. The drum is heated from the bottom outside by a row of gas burners 14. Its power is controlled by the temperature T2 measured on the upper side of the drum which controls a valve 13; it may also take into account temperature Ti of the plaster in the hopper 6. The temperature of the discharged product is essentially the dew point of the atmosphere in the drum. It is measured by the temperature T3 which controls the airflow through the flap valve 15 in order to maintain a given product temperature. The air extracted here is more or less saturated with steam. Also a temperature T4 will control valve 16 so as to control the flow of air in the moistening zone and accordingly the atmosphere in this zone. Another flap valve 20 let air from outside dilute the humid air in order to avoid condensation in the filter. A fan 17 provides the necessary power to entrain air. A controlled gap between the drum 1 and a cover plate 21 provides the inlet for external air. The necessary size of the moistening device results of the throughput and the time needed for the moistening process. Generally a minute is sufficient for spraying (space 22); another two minutes for homogenizing (space 23) is recommendable. The table below indicates reasonable dimensions for a moistening drum using the times mentioned above:

| Capacity | [t/h] | 10 | 20 | 40 |
|---|---|---|---|---|
| diameter | [m] | 1.0 | 1.3 | 1.6 |
| length | [m] | 3.0 | 4.0 | 5.0 |

Since the curing period runs under the same hygrothermal condition as the moistening it is obvious that it is conveniently conducted in the same equipment extended so as to allow the intended time of residence.

Figure 3:
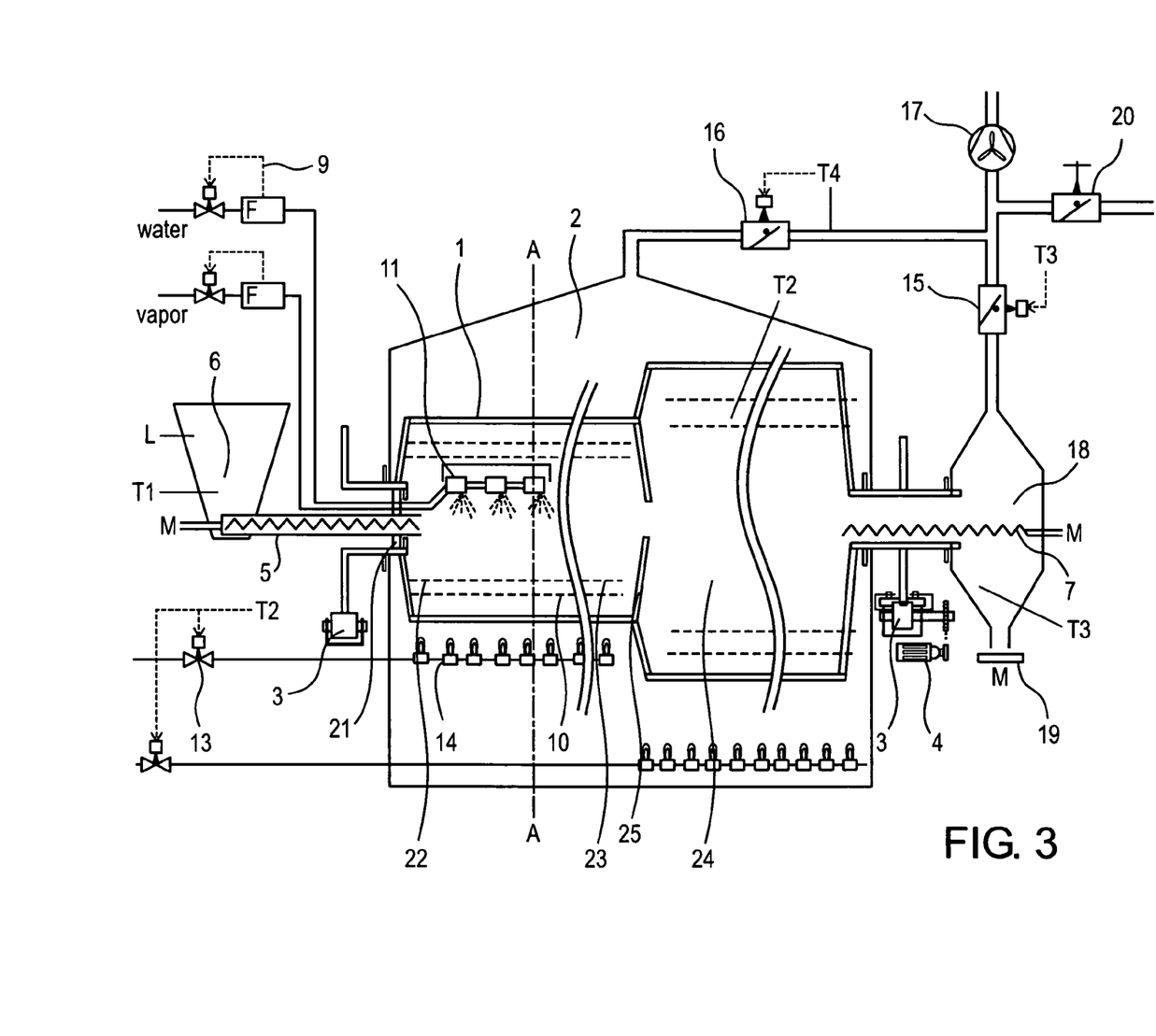
FIG. 3 shows a preferred embodiment of a combined moistening/curing device.

FIGS. 3a and 3b (side view of 3a along lines AA) show another embodiment of the invention. Thus FIG. 3 shows a variant if the device in FIG. 2. The same reference will designate the same part. The curing zone (space 24) is attached to the moistening part but is of larger diameter. It is separated from it by a barrier 25. Reasonable dimensions of the moistening zone are:

| Capacity | [t/h] | 10 | 20 | 40 |
|---|---|---|---|---|
| diameter | [in] | 1.4-1.6 | 1.8-2.0 | 2.3-2.6 |
| length | [m] | 4.2-3.2 | 5.3-4.0 | 6.7-5.0 |

The drying of the cured plaster can be done in many ways known in the art. A stream drier is well suited but consumes relatively much energy for its large volumes of air moved through a cyclone and a bag-house.

Figure 4:
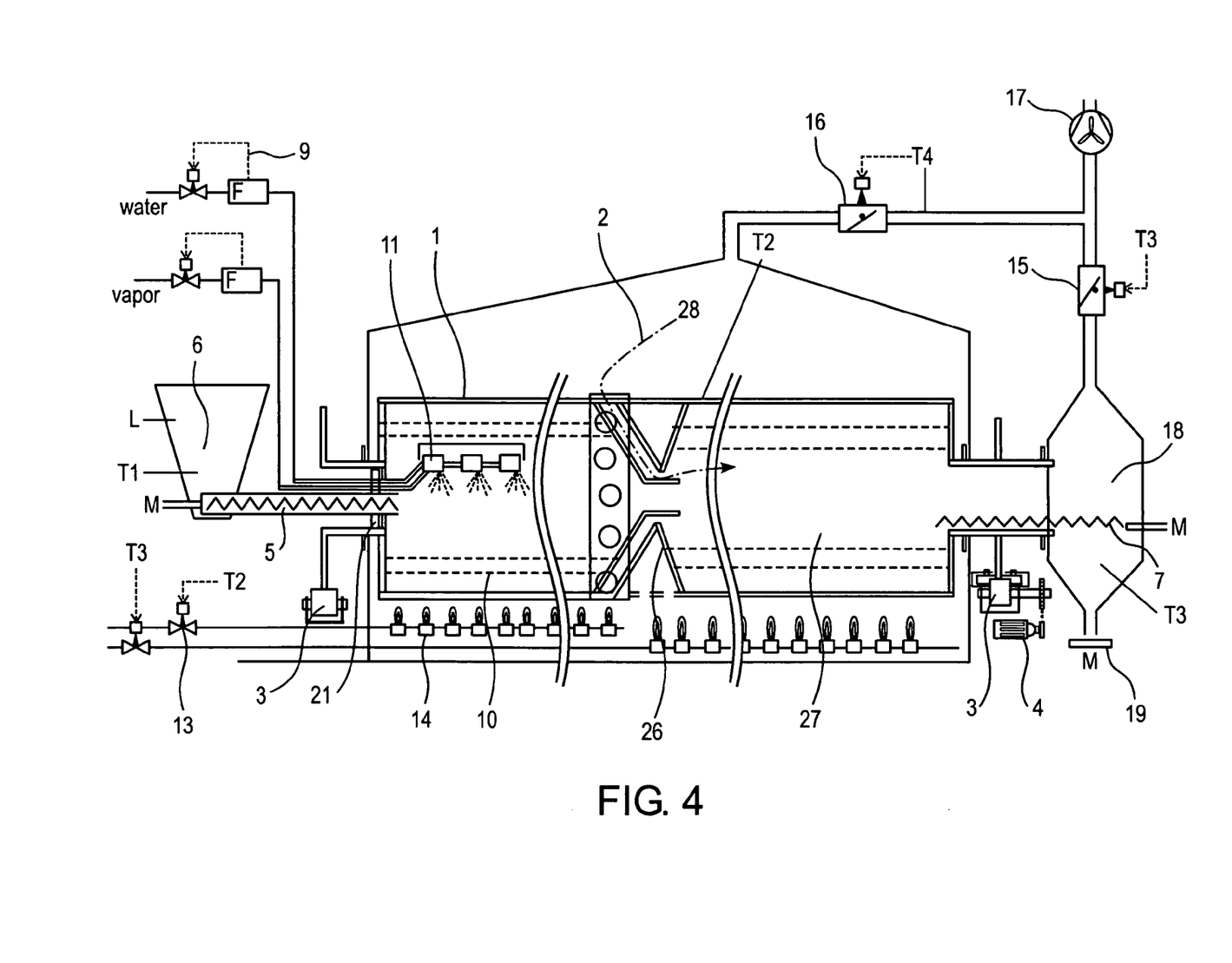
FIG. 4 shows a preferred embodiment of a combined moistening/curing/drying device.

FIG. 4 shows a further embodiment in which the steps of moistening, curing and drying step are combined. In the first part of the drum moistening and curing takes place in a drum designed as in FIG. 2 but longer in order to provide curing space. Attached, in prolongation of this drum, but separated by a notch-shaped wall 26, is a second part 27 of the drum which is more heated from the outside and ventilated with hot air. The path of the hot air is shown by the arrow 28. In the part 27 the moisture is dried out at product temperatures not exceeding 110° C. and preferably below 105° C.

In another embodiment of the invention the steps of drying and grinding are combined. Mill-drying as with an Impmill® or an Ultrarotor® and many others combines drying and grinding. Such a combination is useful when the plaster is to be finely ground.

Another preferred combination is grinding and cooling. If the product leaves the drying step according to the embodiment of FIG. 4, its temperature is already relatively low. A small percentage of free moisture may remain. The air forced trough the mill will dry the remaining moisture and cool simultaneously.

The following examples illustrate the invention without limiting its scope.

For the purpose of testing the process of the invention, a continuous working pilot installation has been built. The pilot was of the type shown in FIG. 2 (save that instead of rotating in a heated space the drum had a double jacket which was gas fired). The pilot was fed with a plaster of FGD origin which had been calcined in an indirectly steam heated rotary calciner. The temperature of the feed at entrance in the pilot was 120° C. in average. The capacity was 150 kg/h for the combined steps of moistening, curing and drying. Moistening was set to 4%±1%. The average residence time was set to 16 minutes. In the combined moistening and drying mode the pilot simulated the apparatus designed in FIG. 4. If one considers a free moisture below 2% at the beginning of the drying process it can be assumed that the moistening and curing time together was in the order of 5 to 10 minutes (which is about in the saturation level). The control parameters for the product were the temperature and the moisture. The process could be controlled by the air flow allowed to pass the drum in counter current and the external heating temperature. The air flow was regulated by the width of a gap at the feeding side in order to maintain the product temperature at the required level. The temperature of the external heating reached 185° C. Under those conditions the product left the drum at a temperature of 100±5° C. and a LOI of 6.5 to 7.5%. In the moistening mode the internal space was tightened in order to avoid significant air exchange. The product at the discharge had lost a maximum of two percent of the original moisture. The external heating reached 125° C. The temperature of the discharged product was around 85° C.±10° C. In this mode only the occurrence of DH was of interest. Small samples were quickly dried in an oven at 50° C. and tested for combined water and by Differential Thermal Analysis (DTA)

The following plaster samples were tested, as reported in the table below. All samples are made out of the same source of raw gypsum which is a FGD gypsum of a German lignite fired power plant and all are calcined in the same plaster plant which uses a indirectly steam fired rotary kiln. Samples 1a, 1b, 2, 3 and 4 are of the conventional type. Samples 5 to 9 are according to the invention.

TABLE 1

| Sample | Type |
|---|---|
| 1a | FGD gypsum calcined, not ground, from silo |
| 1b | FGD gypsum calcined, not ground, after calciner |
| 2 | FGD gypsum calcined, not ground, after 4 month storage in a plastic bag |
| 3 | FGD gypsum calcined ground to d50 = 28 µm, fresh |
| 4 | sample 3 stored 24 hrs at 35° C./90RH (conventional forced ageing) |
| 5 | Moistened, cured, dried, cooled, not ground, fresh |
| 6 | sample 5 but after 4 month storage |
| 7 | sample 5 but ground to d50 = 24 µm |
| 8 | sample 5 but ground to d50 = 12 µm |
| 9 | sample 5 but ground to d50 = 5 µm |
| 10 | 50% sample 6, 50% sample 8 |

For the purpose of determining the mechanical stability of a plaster we define first:

The slump is the diameter of a slurry cake produced with a Schmidt ring, and slump1 is the slump of a plaster gauged by hand while slump2 is the slump of a plaster gauged with a blender shaft type Braun® MR400, 300 W for 20 s. The Water/Plaster (W/P) ratio is maintained at 0.75.

For the purpose of judging the stability we define as reference the slump of a stabilized plaster of a given PSD with the slump of a given plaster of the same PSD. The stability factor 1 is the ratio of the slumps hand gauged. The stability factor 2 is the ratio of the mixed plasters. All were at a W/P ratio of 0.75.

The PSD of plasters is measured by a Laser Granulometer of the type Malvern® Mastersizer, with the plaster being dispersed by ultrasonic treatment in alcohol.

For the purpose of determining filterability we blend 100 g of plaster with 500 g of water (containing enough retarder to allow the operation without setting). The suspension is given into a cylinder of 80 mm diameter. Pressured air of 1 bar pushes the water through the filter. The water released is recorded over the square of the time. In this case linear curves are obtained. The slope of the curves gives an indication of the filterability of the plaster. As above, filterability 1 relates to hand-gauged whereas filterability 2 relates to mixed suspensions. The higher the value the faster goes the filtration. A stability factor 3 is defined as the ratio between the two slopes. It gives an indication how much the filterability is affected by the mixing process.

It has to be noticed that the slope measured this way is only a simple indicator. To translate it into filtering times needed for a given percentage of water released one must read the diagram and calculate the squares of the abscises values.

The following table shows the properties of the various plaster samples.

| Sample | Combined water % | US consistency | Slump 1 mm | Slump 2 mm | Stability factor 1 | Stability factor 2 | Filterability 1 | Filterability 2 | Stability factor 3 |
|---|---|---|---|---|---|---|---|---|---|
| 1a | 5.6 | — | 150 | 220 | — | — | — | — | — |
| 1b | 5.4 | — | 140 | 130 | — | — | — | — | — |
| 2 | 5.8 | — | 130 | 135 | 0.65 | 0.57 | 35 | 9 | 0.28 |
| 3 | 5.8 | 66 | 225 | 180 | 0.94 | 0.71 | 9 | 5.5 | 0.62 |
| 4 | 7.2 | — | 205 | 245 | 1.03 | 1.04 | — | — | — |
| 5 | 7.2 | — | 195 | 230 | 0.98 | 0.98 | — | — | — |
| 6 | 7.0 | — | 200 | 235 | 1.00 | 1.00 | — | — | — |

-continued

| Sample | Combined water % | US consistency | Slump 1 mm | Slump 2 mm | Stability factor 1 | Stability factor 2 | Filterability 1 | Filterability 2 | Stability factor 3 |
|---|---|---|---|---|---|---|---|---|---|
| 7 | 7.0 | 56 | 240 | 255 | 1.00 | 1.00 | — | — | — |
| 8 | 6.7 | 62 | 265 | 290 | — | — | 13 | 10 | 0.88 |
| 9 | 7.0 | 74 | 210 | 230 | — | — | — | — | — |
| 10 | 7.0 | 60 | — | — | — | — | 27 | 23 | 0.85 |

Sample 2 vs. sample 4 shows the effect of conventional ageing.

The values in the table also shows that the accelerated ageing according to the invention yields the essentially the same product as conventional time-demanding ageing.

Sample 2 vs. samples 5 and 6 shows clearly the effect of the treatment of the invention on the not ground material with regard to slumps and stability factors of any kind. The same holds true for the comparison of sample 3 vs. sample 7. Even at slightly lower PSD the slump values of sample 7 are higher bigger than of sample 3. The slump 2 is even higher than slump 1.

The comparison of the samples 7 with sample 8 shows that a fineness of d50=12 μm gives a better fluidity than the coarser material. This phenomenon is as surprising as is the absolute value of slump 2 of sample 8. Equally surprising are the absolute values of slump 1 and 2 of sample 9. With a non treated material one can expect less than 150 mm. The filterability of sample 8 is better than that of sample 3 with a much coarser PSD.

Surprisingly sample 10 which is a blend of 50% sample 5 and 50% sample 8 gives filterabilities of about the average of both. Translated in filtering time the ratio sample 7/sample 5 is 6.3 while the ratio sample 8/sample 10 is 2.2.

Compared with the standard product of non-treated plaster, treated plasters as in sample 7 to 9 have considerable advantages in many applications where a low water demand or a high fluidity at a given W/P ratio is required. This is the case for plasterboard production or prefabricated (molded) products of any kind.

For industrial plasters, in addition to low water demand, constancy is primordial. Treated plasters according to the invention offer this constancy over different production lots and over a long storage period because they are treated at the saturation level.

The resistance to mechanical destruction during mixing of treated plasters is unmatched by conventional plasters. Therefore they are best suited for application where a good filterability is required, as it is the case for gypsum fiberboard. One application of plasters, very often forgotten in the art, is its use as a binder in fiber reinforced products made out of a pulp of fibers and plaster, where a considerable amount of surplus water has to be removed either by suction or by compression filtering. The resistance to mechanical destruction during mixing of treated plasters of the invention is unmatched by conventional plasters. Therefore they are best suited for application where a good filterability is required, as it is the case for gypsum fiberboard.

The invention claimed is:

1. An apparatus comprising a feeding screw, an extracting screw, a rotating drum with lifting blades suspended on ribbon springs inside wherein walls in contact with a product are externally heated at a temperature above 100° C., and one or more pulverizing nozzles, the nozzles being covered with a slightly inclined roof positioned so that the lifting blades will clean the roof upon rotating, wherein the roof is independent from the nozzles, and the nozzles have outlets disposed transversally to a rotating axis of the drum.

2. The apparatus of claim 1 wherein the roof is inclined so that the spring suspended lifting blades will come under tension onto the roof upon rotating and hit an obstacle when released.

3. An apparatus for moistening and curing β-hemihydrate plaster comprising a curing space attached to the apparatus of claim 1, rotating on the same axis as the rotating drum.

4. An apparatus for moistening, curing and drying β-hemihydrate plaster comprising a drying space attached to the moistening and curing apparatus of claim 3, rotating on the same axis as the rotating drum.

5. The apparatus of claim 4, the drying space being connected by air ducts to an externally heated space.

6. The apparatus of claim 4, wherein the drying space is externally heated at a wall temperature above 125° C.

7. The apparatus of claim 5, wherein the air passing from the externally heated space to the interior of the drying space is heated above the temperature of the externally heated space before passing into the interior of the drying space.

8. The apparatus of claim 1, comprising only one rotating drum.

* * * * *